US012368202B2

(12) United States Patent
Ryu et al.

(10) Patent No.: US 12,368,202 B2
(45) Date of Patent: Jul. 22, 2025

(54) BATTERY MODULE, BATTERY PACK COMPRISING BATTERY MODULE AND VEHICLE

(71) Applicant: LG Energy Solution, Ltd., Seoul (KR)

(72) Inventors: Sang-Woo Ryu, Daejeon (KR); Jee-Soon Choi, Daejeon (KR); Yong-Seok Choi, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 601 days.

(21) Appl. No.: 17/768,086

(22) PCT Filed: Apr. 29, 2021

(86) PCT No.: PCT/KR2021/005469
§ 371 (c)(1),
(2) Date: Apr. 11, 2022

(87) PCT Pub. No.: WO2021/230542
PCT Pub. Date: Nov. 18, 2021

(65) Prior Publication Data
US 2023/0282915 A1   Sep. 7, 2023

(30) Foreign Application Priority Data
May 11, 2020   (KR) .................... 10-2020-0056134

(51) Int. Cl.
*H01M 50/209*   (2021.01)
*H01M 50/204*   (2021.01)
*H01M 50/267*   (2021.01)

(52) U.S. Cl.
CPC ....... *H01M 50/204* (2021.01); *H01M 50/267* (2021.01); *H01M 2220/20* (2013.01)

(58) Field of Classification Search
CPC ............ H01M 50/204; H01M 50/267; H01M 2220/20; H01M 50/211; H01M 50/20; H01M 10/625; Y02E 60/10
See application file for complete search history.

(56) References Cited

U.S. PATENT DOCUMENTS

| 2013/0143092 A1 | 6/2013 | Nagatani et al. |
| 2016/0006006 A1 | 1/2016 | Motokawa et al. |

(Continued)

FOREIGN PATENT DOCUMENTS

| CN | 201044253 Y | 4/2008 |
| CN | 107933276 A | 4/2018 |

(Continued)

OTHER PUBLICATIONS

Search Report dated Aug. 21, 2023 from the Office Action for Chinese Application No. 202180005413.7 issued Aug. 26, 2023, 3 pages. [See p. 2, categorizing the cited references].

(Continued)

*Primary Examiner* — Cynthia K Walls
(74) *Attorney, Agent, or Firm* — Lerner David LLP

(57) ABSTRACT

The present disclosure relates to a battery module with reduced manufacturing cost and a battery pack comprising the same. To achieve the above-described object, the battery module according to the present disclosure includes a cell assembly including a plurality of secondary batteries, and a module housing in which the cell assembly is received, wherein the module housing includes at least two frames capable of changing a length of the module housing according to a size of the cell assembly.

13 Claims, 11 Drawing Sheets

(56) References Cited

U.S. PATENT DOCUMENTS

| | | |
|---|---|---|
| 2017/0187082 A1 | 6/2017 | Zhao et al. |
| 2019/0131596 A1 | 5/2019 | Yang et al. |
| 2019/0260099 A1 | 8/2019 | Ju et al. |
| 2020/0287182 A1 | 9/2020 | Kong et al. |

FOREIGN PATENT DOCUMENTS

| | | |
|---|---|---|
| CN | 108470859 A | 8/2018 |
| CN | 110168799 A | 8/2019 |
| CN | 110506345 A | 11/2019 |
| CN | 110915019 A | 3/2020 |
| EP | 3550661 A1 | 10/2019 |
| EP | 3567670 A1 | 11/2019 |
| JP | S56-101862 U | 8/1981 |
| JP | 2001-256940 A | 9/2001 |
| JP | 3131680 U | 5/2007 |
| JP | 2017504149 A | 2/2017 |
| KR | 200439828 Y1 | 5/2008 |
| KR | 20140026098 A | 3/2014 |
| KR | 20160062405 A | 6/2016 |
| KR | 20170078381 A | 7/2017 |
| KR | 20180041536 A | 4/2018 |
| KR | 20180135701 A | 12/2018 |
| KR | 20190083887 A | 7/2019 |
| KR | 20190090956 A | 8/2019 |
| KR | 102038456 B1 | 10/2019 |
| KR | 20200008624 A | 1/2020 |
| WO | 2012-026224 A1 | 3/2012 |
| WO | 2014-125807 A1 | 8/2014 |
| WO | 2019-083149 A1 | 5/2019 |

OTHER PUBLICATIONS

International Search Report for Application No. PCT/KR2021/005469 mailed Aug. 19, 2021, 2 pages.
Extended European Search Report for Application No. 21803176.3 dated Apr. 6, 2023. 9 pgs.

BATTERY MODULE, BATTERY PACK COMPRISING BATTERY MODULE AND VEHICLE

CROSS-REFERENCE TO RELATED APPLICATIONS

The present application is a national phase entry under 35 U.S.C. § 371 of International Application No. PCT/KR2021/005469, filed on Apr. 29, 2021, published in Korean, which claims priority to Korean Patent Application No. 10-2020-0056134, filed on May 11, 2020, the disclosures of which are incorporated herein by reference in their entireties.

TECHNICAL FIELD

The present disclosure relates to a battery module, a battery pack comprising the battery module and a vehicle, and more particularly, to a battery module with reduced manufacturing cost and a battery pack comprising the same.

BACKGROUND ART

Currently, commercially available secondary batteries include nickel-cadmium batteries, nickel-hydrogen batteries, nickel-zinc batteries, lithium secondary batteries and the like, and among them, lithium secondary batteries have little or no memory effect, and thus they are gaining more attention than nickel-based secondary batteries for their advantages that recharging can be done whenever it is convenient, the self-discharge rate is very low and the energy density is high.

A lithium secondary battery primarily uses a lithium-based oxide and a carbon material for a positive electrode active material and a negative electrode active material respectively. Additionally, the lithium secondary battery includes an electrode assembly including a positive electrode plate and a negative electrode plate respectively coated with the positive electrode active material and the negative electrode active material and a separator interposed between the positive electrode plate and the negative electrode plate, and a cylindrical battery case or a packaging in which the electrode assembly is received together with an electrolyte solution in an airtight manner.

Recently, secondary batteries are being widely used in not only small devices such as portable electronic products but also medium- and large-scale devices such as vehicles and energy storage systems (ESSs). For use in medium- and large-scale devices, many secondary batteries are electrically connected to increase the capacity and output. In particular, pouch-type secondary batteries are widely used in medium- and large-scale devices due to their advantage that they can be easily stacked.

More recently, with the use as a source of energy and the growing need for high capacity structures, there is an increasing demand for a battery pack including a plurality of battery modules, each battery module including a plurality of secondary batteries connected in series and/or in parallel.

Further, secondary batteries of various sizes may be applied according to the capacity of the battery module required for products. That is, the size change of the secondary batteries leads to a size change of a module housing in which the plurality of secondary batteries is received, which requires a design modification of the module housing and a change in production equipment. The design modification greatly increases the manufacturing cost of the battery module or the battery pack, and is a factor that impedes the production cost reduction.

DISCLOSURE

Technical Problem

The present disclosure is designed to solve the above-described problem, and therefore the present disclosure is directed to providing a battery module with reduced manufacturing cost, a battery pack comprising the same and a vehicle.

These and other objects and advantages of the present disclosure may be understood by the following description, and will be apparent from the embodiments of the present disclosure. In addition, it will be readily appreciated that the objects and advantages of the present disclosure may be realized by means and combinations thereof.

Technical Solution

To achieve the above-described object, a battery module according to the present disclosure includes a cell assembly including a plurality of secondary batteries, and a module housing in which the cell assembly is received, wherein the module housing includes at least two frames capable of changing a length of the module housing according to a size of the cell assembly.

Additionally, the at least two frames may be configured such that one frame is received in an internal space of the other frame or one frame extends from the internal space of the other frame.

Additionally, each of the at least two frames may include a cover plate which covers a top of the cell assembly and sides of the cell assembly in a horizontal direction, and a bottom plate coupled with a bottom of the cover plate and configured to mount the cell assembly.

Further, each of the at least two frames may have a coupling groove into which a part of other frame is inserted, and an insertion portion which is inserted into the coupling groove of the other frame.

Additionally, each of the coupling groove and the insertion portion may extend in a lengthwise direction in which the module housing changes, and the at least two frames may be configured to be movable in the lengthwise direction when the coupling groove and the insertion portion are coupled to each other.

Further, any one of the at least two frames may be configured to receive at least one other frame therein by the coupling of the coupling groove and the insertion portion.

Additionally, the cover plate and the bottom plate may include an insertion groove running inward to couple the cover plate and the bottom plate, and a coupling protrusion to be configured to be inserted into the insertion groove.

Further, the battery module may further include a fixing member configured to limit the length change of the module housing.

Additionally, the battery module may further include a filler configured to fill an empty space of the coupling groove into which the insertion portion is not inserted.

Meanwhile, a battery pack of the present disclosure includes at least two battery modules wherein the at least two battery modules are arranged such that sides of the module housings come into contact with each other.

Additionally, any one of the at least two frames of the battery module may have a larger size than the other frame to receive the other frame therein, and the frame having the larger size in the one battery module and the frame having a smaller size in the other battery module may be arranged in contact with each other.

Additionally, to achieve the above-described object, a vehicle according to the present disclosure includes the battery pack according to the present disclosure.

Advantageous Effects

According to an aspect of the present disclosure, the battery module of the present disclosure includes the module housing including the at least two frames capable of changing the length of the module housing according to the size of the cell assembly, thereby adjusting the length of the module housing according to the size of the cell assembly, so one type of module housing may be applied to the battery modules of various sizes, thereby eliminating the need to produce the module housings of different sizes for each of the battery modules of various sizes. Accordingly, the battery module of the present disclosure is easy to customize, which makes mass production easy and eliminates the need to change the design of products, thereby dramatically reducing the manufacturing cost.

Additionally, according to an aspect of the present disclosure, the at least two frames of the present disclosure may be configured such that any one frame accommodates at least one other frame by coupling of the coupling groove and the insertion portion, thereby reducing the module housing according to the size of the cell assembly applied. Additionally, the battery module of the present disclosure may be manufactured by minimizing the size of the module housing to deliver in a compact size and making primary or secondary modification according to the size of the cell assembly in the assembling process. Accordingly, it is possible to reduce the delivery or storage cost of the battery module.

Further, the battery pack of the present disclosure is configured such that the frame having a larger size in one battery module and the frame having a smaller size in the other battery module are arranged in contact with each other, thereby minimizing the size of the gap between the plurality of battery modules, and effectively increasing the energy density of the battery pack. Additionally, when the plurality of battery modules is arranged in contact with each other, there is no empty space, so the battery modules may not lose the arrangement from external impacts. Accordingly, it is possible to effectively increase the durability of the battery pack.

BRIEF DESCRIPTION OF THE DRAWINGS

The accompanying drawings illustrate preferred embodiments of the present disclosure, and together with the following detailed description, serve to provide a further understanding of the technical aspect of the present disclosure. However, the present disclosure should not be construed as being limited to the drawings.

DETAILED DESCRIPTION

Figure 1:
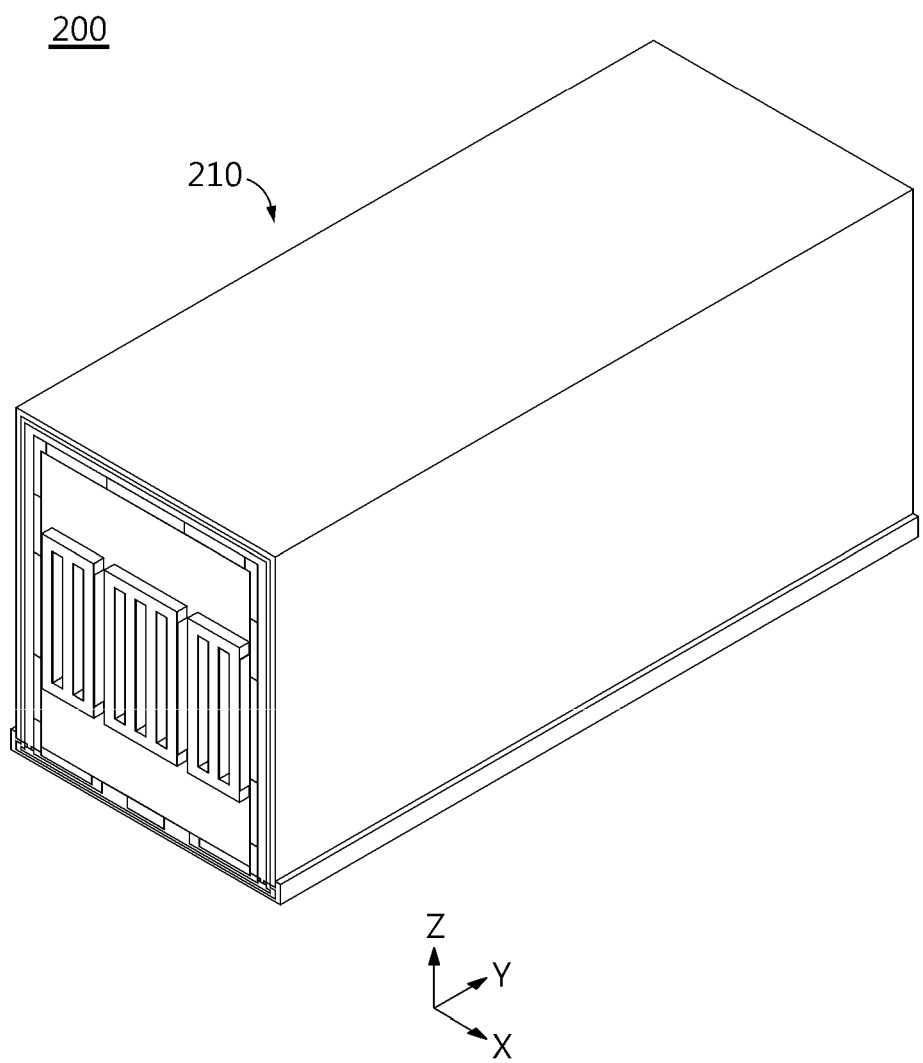
FIG. 1 is a perspective view schematically showing a battery module according to an embodiment of the present disclosure.

Hereinafter, the preferred embodiments of the present disclosure will be described in detail with reference to the accompanying drawings. Prior to the description, it should be understood that the terms or words used in the specification and the appended claims should not be construed as being limited to general and dictionary meanings, but rather interpreted based on the meanings and concepts corresponding to the technical aspects of the present disclosure on the basis of the principle that the inventor is allowed to define the terms appropriately for the best explanation.

Therefore, the embodiments described herein and the illustrations shown in the drawings are just a most preferred embodiment of the present disclosure, but not intended to fully describe the technical aspects of the present disclosure, so it should be understood that a variety of other equivalents and modifications could have been made thereto at the time that the application was filed.

Figure 2:
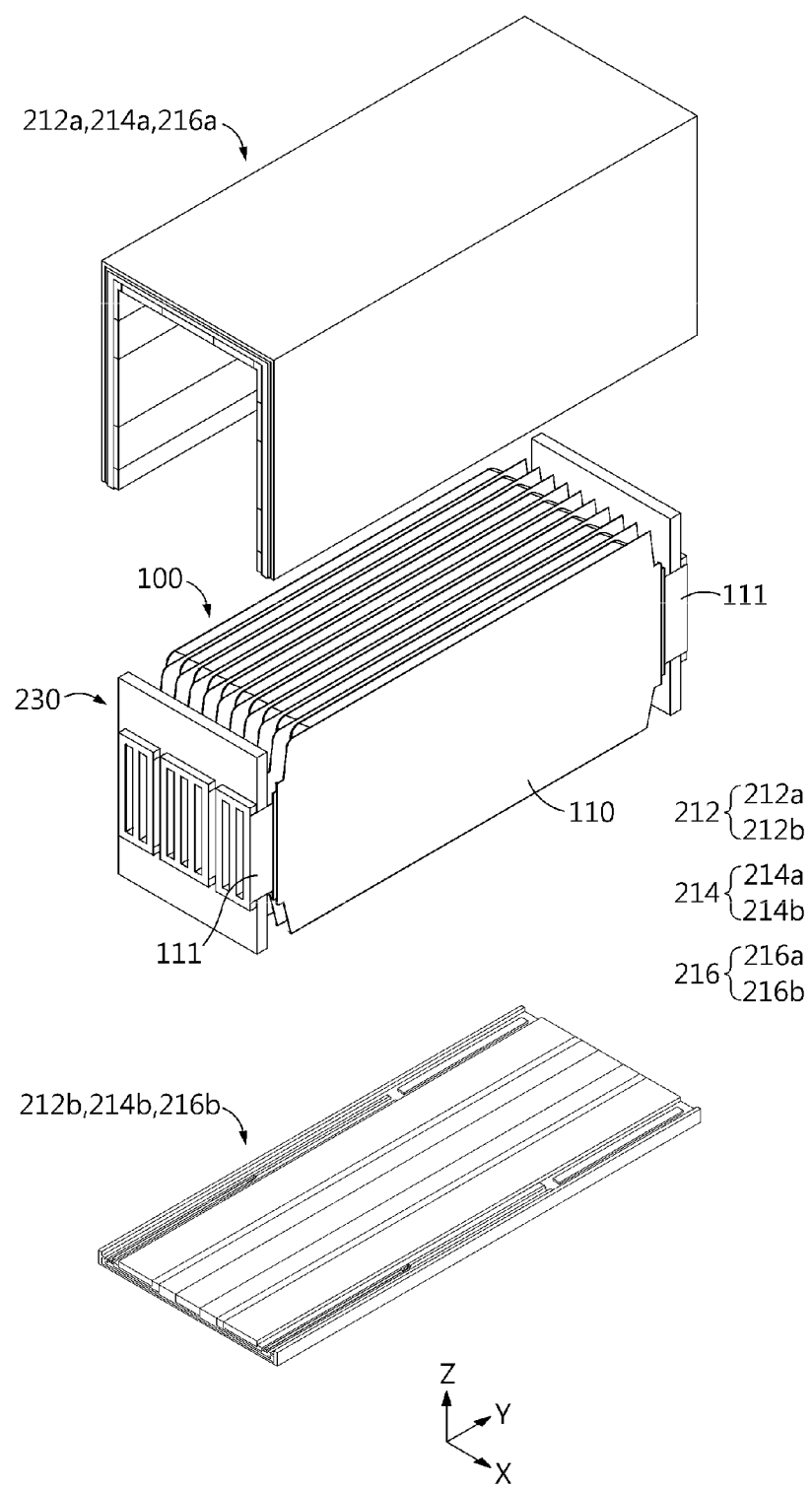
FIG. 2 is an exploded perspective view schematically showing a battery module according to an embodiment of the present disclosure.

FIG. 1 is a perspective view schematically showing a battery module according to an embodiment of the present disclosure. Additionally, FIG. 2 is an exploded perspective view schematically showing the battery module according to an embodiment of the present disclosure. For reference, in FIG. 1, X axis direction is the left direction, Y axis direction is the rear direction, and Z axis direction is the up direction.

Referring to FIGS. 1 and 2, the battery module 200 of the present disclosure includes a cell assembly 100 and a module housing 210. Specifically, the cell assembly 100 may include a plurality of secondary batteries 110. In this instance, the secondary battery 110 may be a pouch-type secondary battery 110. In particular, the pouch-type secondary battery 110 may include an electrode assembly, an electrolyte and a pouch case.

Here, the electrode assembly may include at least one positive electrode plate and at least negative electrode plate with a separator interposed between. More specifically, the electrode assembly may be classified into a winding type electrode assembly in which a positive electrode plate and a negative electrode plate are wound together with a separator, and a stack type electrode assembly in which a plurality of positive electrode plates and a plurality of negative electrode plate are stacked in an alternating manner with a separator interposed between.

Additionally, the pouch case may include an outer insulating layer, a metal layer and an inner insulating layer. The pouch case may include a metal thin film, for example, an aluminum thin film, to protect the internal components such as the electrode assembly and the electrolyte solution, and enhance the electrical and chemical properties by the electrode assembly and the electrolyte solution and heat radiation. Additionally, the aluminum thin film may be interposed between the insulating layers to ensure electrical insulation from the internal components of the secondary batteries 110 such as the electrode assembly and the electrolyte solution or other components outside of the secondary batteries 110.

In particular, the pouch case may include 2 pouches, and at least one of the pouches may have a concave internal space. Additionally, the electrode assembly may be received in the internal space of the pouch. Additionally, a sealing portion may be provided on the outer peripheral surfaces of the 2 pouches, and when joined together, the sealing portions may hermetically seal the internal space in which the electrode assembly is received.

Each pouch-type secondary battery 110 may include an electrode lead 111, and the electrode lead 111 may include a positive electrode lead and a negative electrode lead.

More specifically, the electrode lead 111 may extend frontward or rearward from the sealing portion disposed at the front or rear outer periphery of the pouch case. Additionally, the electrode lead 111 may serve as an electrode terminal of the secondary battery 110. For example, as shown in FIG. 2, one electrode lead 111 may extend frontward from the secondary battery 110, and the other electrode lead 111 may extend rearward from the secondary battery 110.

According to this configuration of the present disclosure, it is possible to eliminate interference between the positive electrode lead and the negative electrode lead in one secondary battery 110, thereby increasing the area of the electrode lead 111 and facilitating a welding process between the electrode lead 111 and a busbar provided in a busbar assembly 230.

The battery module 200 may include the plurality of pouch-type secondary batteries 110 stacked and arranged in at least one direction. For example, as shown in FIG. 2, the plurality of pouch-type secondary batteries 110 may be horizontally stacked side by side. In this instance, each pouch-type secondary battery 110 may stand in a direction approximately perpendicular to the ground with the two wide surfaces disposed on the left and right sides respectively and the sealing portions disposed in the up, down, front and rear directions, when viewed from the front side. In other words, each secondary battery 110 may stand vertically.

The configuration of the pouch-type secondary batteries 110 is obvious to those skilled in the art, and its detailed description is omitted herein. Additionally, the cell assembly 100 according to the present disclosure may employ various types of secondary batteries well known at the time of filing the patent application.

Additionally, the battery module 200 of the present disclosure may include the busbar electrically connecting the plurality of secondary batteries 110 of the cell assembly 100. The busbar may be mounted on a busbar frame of the busbar assembly. The busbar may include a metal material. The busbar may be disposed on each of the front and rear sides of the cell assembly 100.

Meanwhile, the module housing 210 may serve as a case in the battery module 200. Accordingly, the module housing 210 serves to provide structural stability to the battery module 200, and protect the components received therein such as the cell assembly 100 from external mechanical elements such as impacts or materials. To this end, the module housing 210 may include metals such as steel or aluminum or nonconductive plastics.

Figure 3:
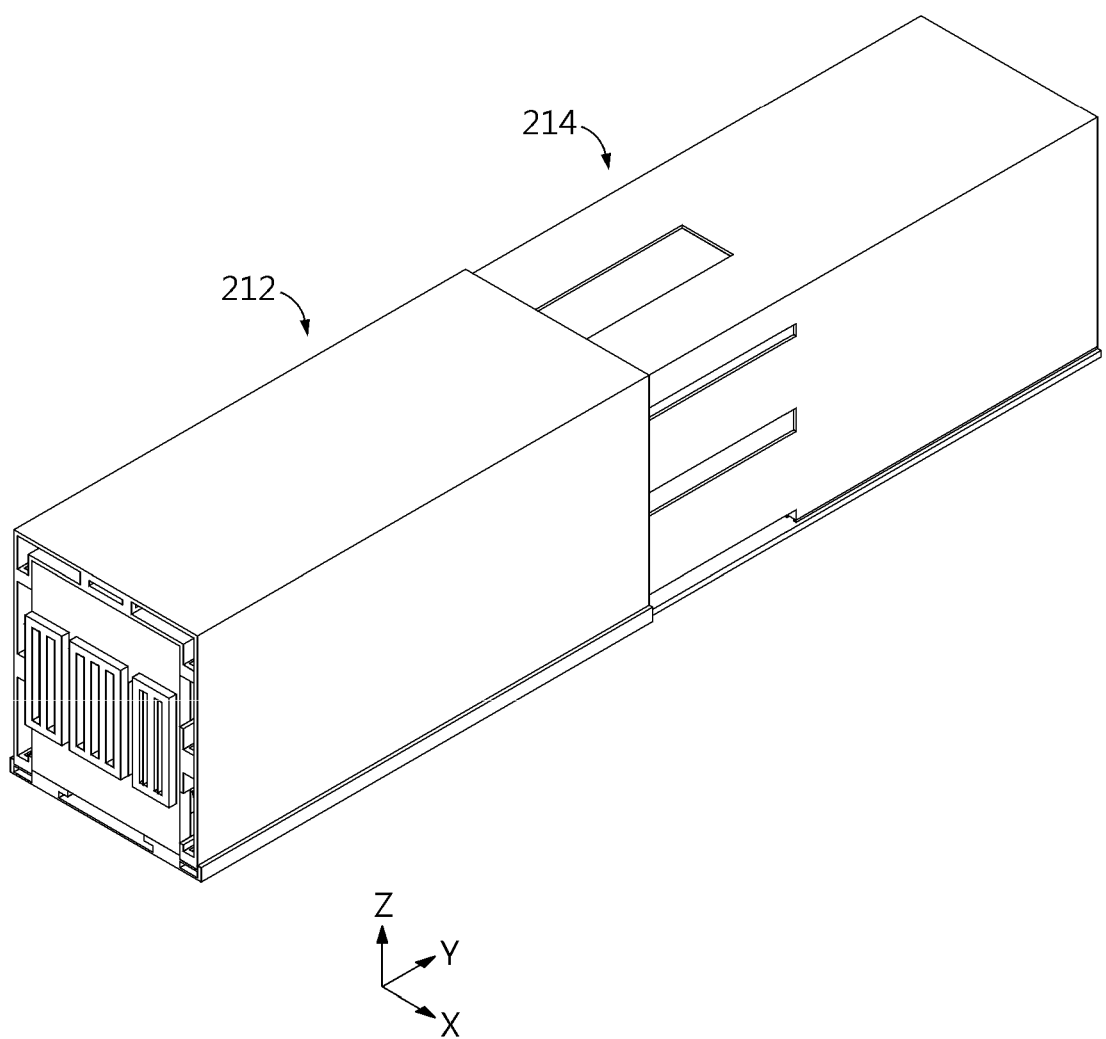
FIG. 3 is a perspective view schematically showing primary modification of the battery module of FIG. 1 of the present disclosure.

FIG. 3 is a perspective view schematically showing primary modification of the battery module of FIG. 1 of the present disclosure. Additionally, FIG. 4 is a perspective view schematically showing secondary modification of the battery module of FIG. 1 of the present disclosure.

Figure 4:
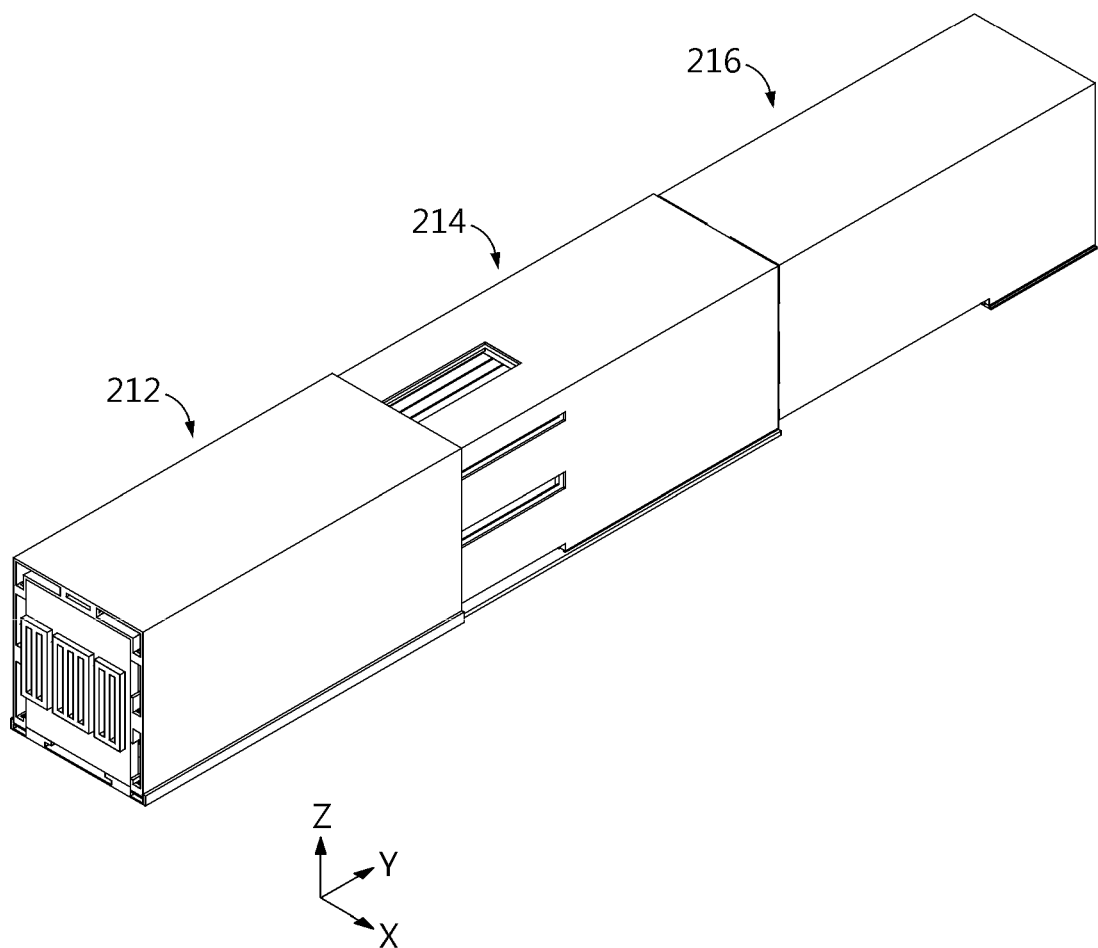
FIG. 4 is a perspective view schematically showing secondary modification of the battery module of FIG. 1 of the present disclosure.

Referring to FIGS. 3 and 4 together with FIGS. 1 and 2, the module housing 210 may include at least two frames 212, 214, 216. The at least two frames 212, 214, 216 may be configured to change the length of the module housing 210 according to the size of the cell assembly 100. For example, when the length in the front-rear direction of the cell assembly 100 received in the battery module 200 shown in FIG. 3 is longer than the length of the cell assembly 100 shown in FIG. 2, the battery module 200 may have primary modification so that the length of the module housing 210 in the front-rear direction increases about twice. Additionally, the module housing 210 of the battery module 200 shown in FIG. 4 may have secondary modification so that the length in the front-rear direction (Y axis direction) increases about 3 times on the basis of the length of the module housing 210 shown in FIG. 1.

According to this configuration of the present disclosure, the module housing 210 includes the at least two frames 212, 214, 216 capable of changing the length of the module housing 210 according to the size of the cell assembly 100, thereby adjusting the length of the module housing 210 according to the size of the cell assembly 100, so one type of module housing 210 may be applied to the battery modules 200 of various sizes, thereby eliminating the need to produce the module housings 210 of different sizes for each of the battery modules 200 of various sizes. Accordingly, the battery module 200 of the present disclosure is easy to customize, which makes mass production easy and eliminates the need to change the design of products, thereby dramatically reducing the manufacturing cost.

Additionally, the at least two frames 212, 214, 216 may have an internal space for receiving the cell assembly 100. For example, the at least two frames 212, 214, 216 may have an upper wall, a left side wall, a right side wall and a lower wall to form a cuboidal internal space. Further, the at least two frames 212, 214, 216 may be open in the front-rear direction so that the cell assembly 100 may be inserted in the front-rear direction.

Further, the at least two frames 212, 214, 216 may be configured such that the internal space of one frame 212 accommodates at least one other frame 214, 216. Alternatively, the at least two frames 212, 214, 216 may be configured such that at least one other frame 214, 216 extends from the internal space of one frame 212. For example, as shown in FIG. 1, the second frame 214 and the third frame 216 may be received in the internal space of the first frame 212. For example, as shown in FIG. 3, the third frame 216 may be received in the internal space of the second frame 214. Additionally, the second frame 214 may be disposed such that it extends rearward from the internal space of the first frame 212.

Referring back to FIG. 2, the at least two frames 212, 214, 216 may include cover plates 212a, 214a, 216a and bottom plates 212b, 214b, 216b. The cover plates 212a, 214a, 216a may be configured to cover the top of the cell assembly 100 and the sides of the cell assembly 100 in the horizontal direction. For example, as shown in FIG. 2, the cover plates 212a, 214a, 216a of the module housing 210 may have an upper wall, a left side wall and a right side wall to cover the top and the left and right sides of the cell assembly 100 respectively.

Additionally, the cell assembly 100 may be mounted on the bottom plates 212a, 214a, 216a. The bottom plates 212a, 214a, 216a may have a size corresponding to the lower surface of the cell assembly 100. Further, the bottom plates 212a, 214a, 216a may be coupled with the bottom of the cover plates 212a, 214a, 216a respectively. For example, the bottom plates 212a, 214a, 216a may be respectively coupled with the lower ends of the left side wall and the right side wall of the cover plates 212a, 214a, 216a. For example, parts of each of the cover plates 212a, 214a, 216a and the bottom plates 212a, 214a, 216a may be coupled by male-female coupling.

According to this configuration of the present disclosure, the module housing 210 of the present disclosure includes the cover plates and the bottom plates which are separated from each other, thereby making it easy to mount the cell assembly 100 therein. For example, the cell assembly 100 may be mounted in the module housing 210 by mounting the cell assembly 100 on the bottom plate and coupling the cover plate with the bottom plate.

Figure 5:
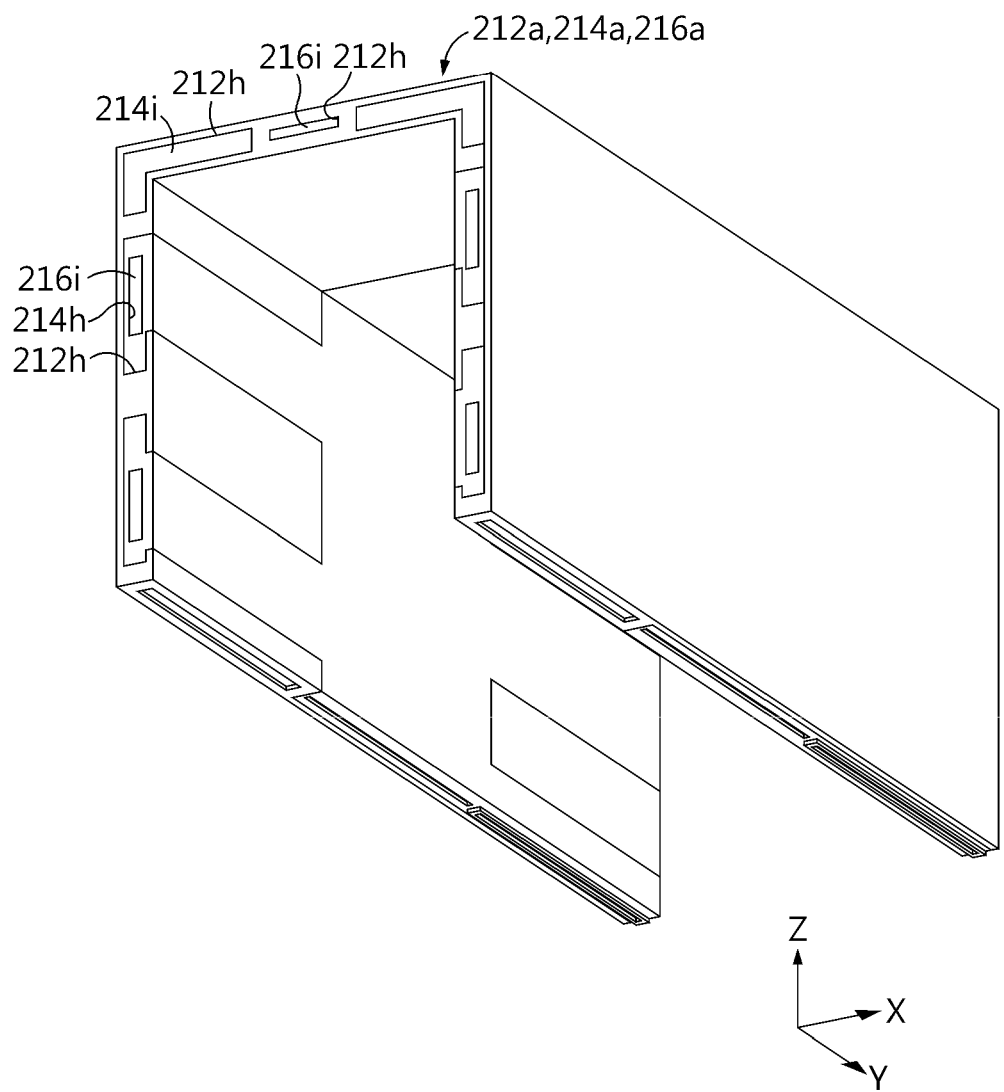
FIG. 5 is a bottom perspective view schematically showing modified frames of a module housing of FIG. 1 of the present disclosure.
Figure 6:
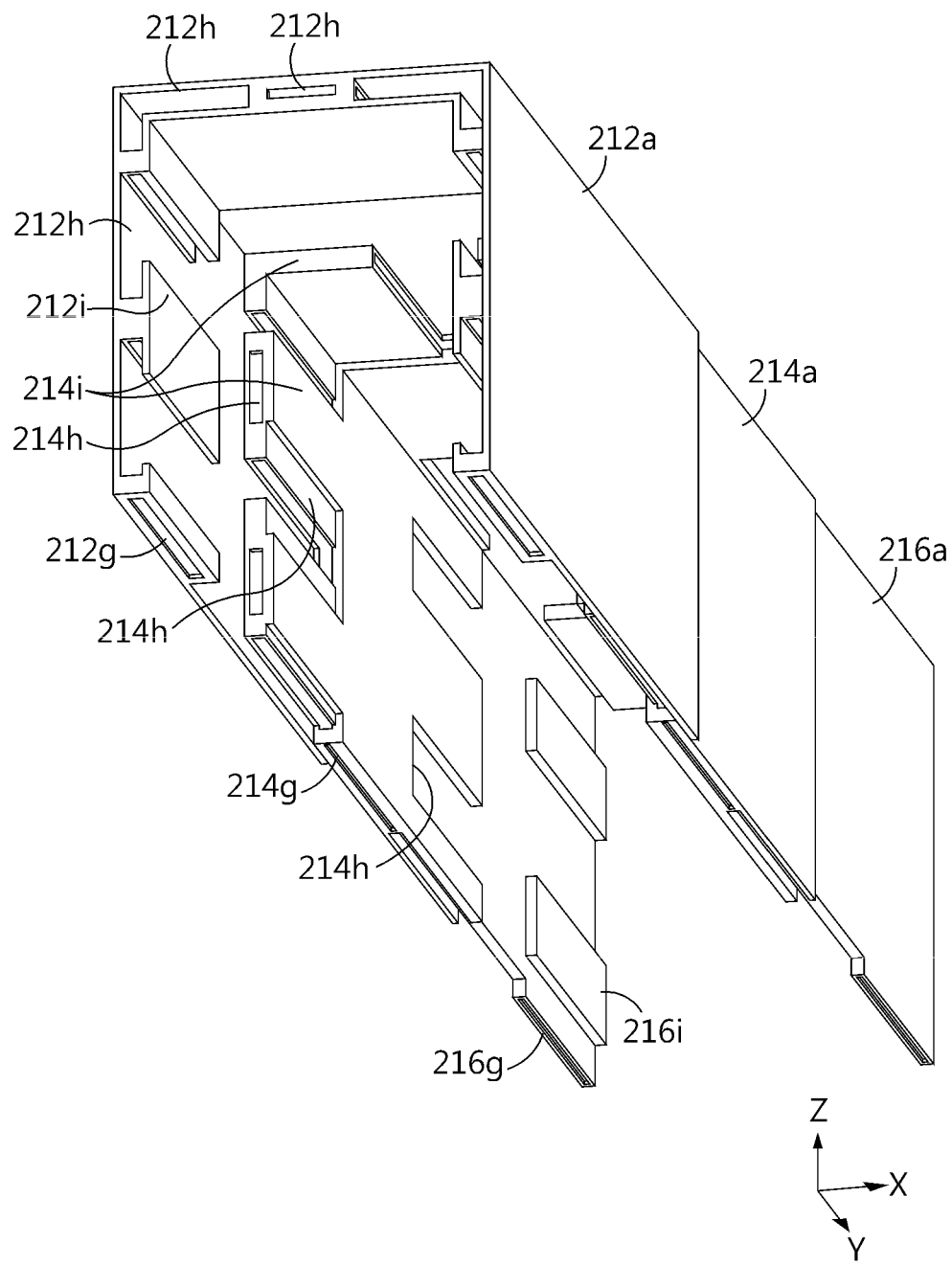
FIG. 6 is a bottom perspective view schematically showing modified cover plates of a module housing of FIG. 4 of the present disclosure.

FIG. 5 is a bottom perspective view schematically showing the modified frames of the module housing of FIG. 1 of the present disclosure. FIG. 6 is a bottom perspective view schematically showing the modified cover plates of the module housing of FIG. 4 of the present disclosure. Additionally, FIG. 7 is a perspective view schematically showing the modified bottom plates of the module housing of FIG. 4 of the present disclosure.

Figure 7:
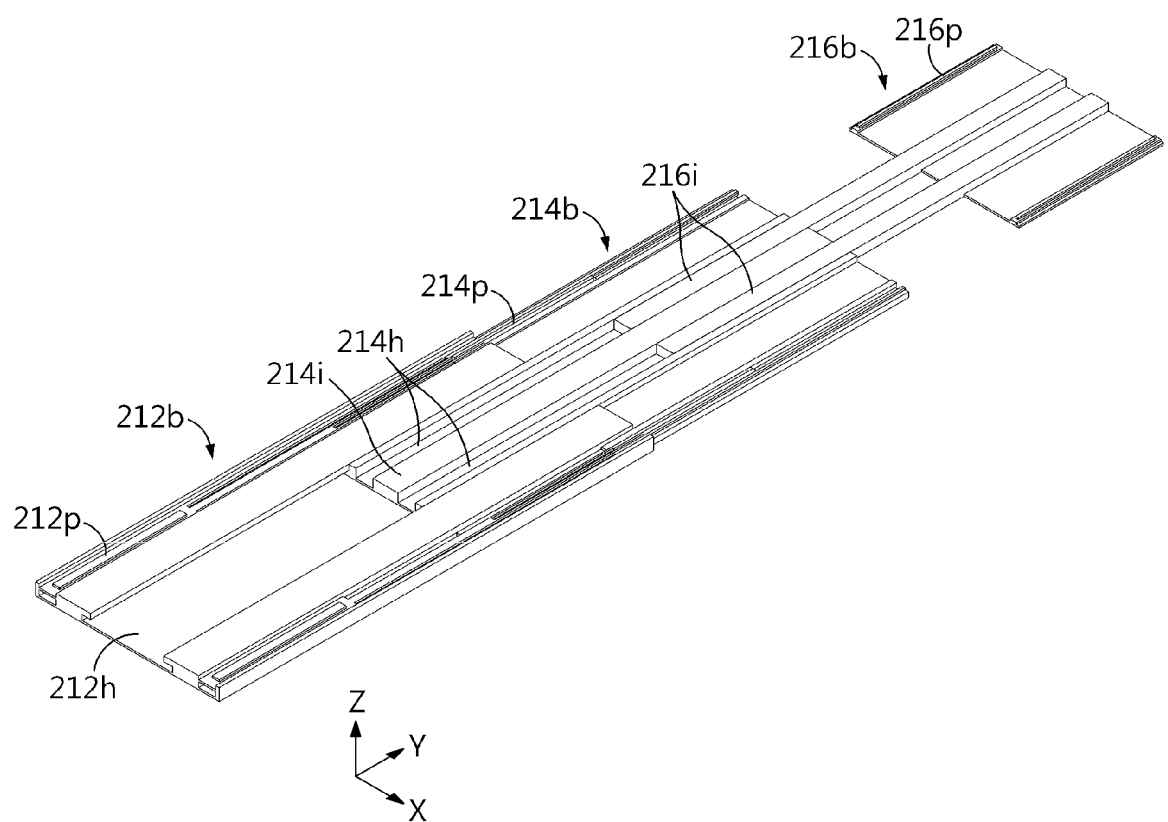
FIG. 7 is a perspective view schematically showing modified bottom plates of a module housing of FIG. 4 of the present disclosure.

Referring to FIGS. 5 to 7 together with FIGS. 3 and 4, the at least two frames 212, 214, 216 may include coupling grooves 212h, 214h and insertion portions 212i, 214i, 216i. Specifically, the insertion portion 214i of one frame 214 may be inserted into the coupling groove 212h of the other frame 212. On the contrary, the insertion portion 214i of the other frame 214 may be inserted into the coupling groove 212h of one frame 212.

For example, referring to FIGS. 5 and 6, the module housing 210 of the present disclosure includes the first frame 212, the second frame 214 and the third frame 216, and the first frame 212 includes the cover plate 212a and the bottom plate 212b. The second frame 214 includes the cover plate 214a and the bottom plate 214b. The third frame 216 includes the cover plate 216a and the bottom plate 216b. Among the three frames 212, 214, 216, the battery pack 300 may include the first frame 212 of the larger size, the second frame 214 of the intermediate size, and the third frame 216 of the smaller size in the order of size.

Additionally, the cover plate 212a of the first frame 212 may include the coupling groove 212h and the insertion portion 212i. The cover plate 214a of the second frame 214 may include the coupling groove 214h and the insertion portion 214i. Additionally, the cover plate 216a of the third frame 216 may include the coupling groove and the insertion portion 216i.

For example, as shown in FIGS. 5 and 6, the cover plate 212a of the first frame 212 may include the coupling groove 212h into which the insertion portion 214i of the cover plate 214a of at least one of the second frame 214 or the third frame 216 is inserted. The cover plate 214a of the second frame 214 may include the coupling groove 214h into which the insertion portion 216i of the cover plate 216a of the third frame 216 is inserted. The cover plate 216a of the third frame 216 may include the insertion portion 216i which is inserted into the coupling groove 212h of the cover plate 212a of at least one of the first frame 212 or the second frame 214.

Further, the bottom plates 212b, 214b, 216b may include coupling grooves 212h, 214h and insertion portions 212i, 214i, 216i. For example, as shown in FIG. 7, the bottom plate 212b of the first frame 212 may include the coupling groove 212h into which the insertion portion 214i of the bottom plate 214b of at least one of the second frame 214 or the third frame 216 is inserted. The bottom plate 214b of the second frame 214 may include the coupling groove 214h into which the insertion portion 216i of the bottom plate 216b of the third frame 216 is inserted. The bottom plate 216b of the third frame 216 may include the insertion portion 216i which is inserted into the coupling groove 212h of the bottom plate 212b of at least one of the first frame 212 or the second frame 214.

Additionally, each of the coupling grooves 212h, 214h may extend in the lengthwise direction in which the module housing 210 changes. Each of the insertion portions 212i, 214i, 216i may extend in the lengthwise direction in which the module housing 210 changes.

For example, as shown in FIG. 6, the cover plates 212a, 214a of the first frame 212 and the second frame 214 may include the coupling grooves 212h, 214h extending in the front-rear direction respectively. The cover plates 212a, 214a of the second frame 214 and the third frame 216 may include the insertion portions 214i, 216i extending in the front-rear direction respectively.

For example, as shown in FIG. 7, the bottom plates 212b, 214b of the first frame 212 and the second frame 214 may include the coupling grooves 212h, 214h extending in the front-rear direction respectively. The bottom plates 214b, 216b of the second frame 214 and the third frame 216 may include the insertion portions 214i, 216i extending in the front-rear direction respectively.

Further, the at least two frames 212, 214, 216 may be configured to be movable in the lengthwise direction when the coupling groove and the insertion portion are coupled to each other. For example, as shown in FIGS. 5 and 6, the cover plates 212a, 214a, 216a and the bottom plate 212b, 214b, 216b of the first frame 212, the second frame 214 and the third frame 216 may be respectively configured to slidably move in the front-rear direction when the coupling grooves 212h, 214h and the insertion portions 212i, 214i, 216i are coupled to each other.

According to this configuration of the present disclosure, the at least two frames 212, 214, 216 of the present disclosure are configured to be movable in the lengthwise direction with the coupling groove and the insertion portion coupled to each other, thereby easily changing the overall length of the module housing 210 according to the size of the cell assembly 100 applied to the module housing 210. Accordingly, it is possible to effectively reduce the manufacturing cost of the battery module 200.

Meanwhile, referring to FIGS. 2 and 5 to 7, the at least two frames 212, 214, 216 may be configured such that at least one frame 214 is received in the other frame 212 by insertion of the insertion portion 214i of the frame 214 into the coupling groove 212h of the frame 212.

For example, as shown in FIG. 5, the cover plates 214a, 216a of the second frame 214 and the third frame 216 may be received in the cover plate 212a of the first frame 212 by insertion of the insertion portions 214i, 216i of the cover plates 214a, 216a of the second frame 214 and the third frame 216 into the coupling groove 212h of the cover plate 212a of the first frame 212. Additionally, the cover plate 216a of the third frame 216 may be received in the cover plate 214a of the second frame 214 by coupling of the coupling groove 214h and the insertion portion 216i. That is, among the three cover plates 212a, 214a, 216a, one cover plate 212a may have the largest size, the other cover plate 214a may have the intermediate size, and the remaining cover plate 216a may have the smallest size.

For example, as shown in FIG. 2, the bottom plates 214b, 216b of the second frame 214 and the third frame 216 may be respectively received in the bottom plate 212b of the first frame 212 by insertion of the insertion portions 214i, 216i of the bottom plates 214b, 216b of the second frame 214 and the third frame 216 into the coupling groove 212h of the bottom plate 212b of the first frame 212.

Additionally, the bottom plate 214b of the second frame 214 may be received in the bottom plate 216b of the third frame 216 by coupling of the coupling groove 214h and the insertion portion 216i. In this instance, among the three bottom plates 212b, 214b, 216b, one bottom plate 212b may have the largest size, the other bottom plate 214b may have the intermediate size, and the remaining bottom plate 216b may have the smallest size.

According to this configuration of the present disclosure, the at least two frames 212, 214, 216 may be configured such that any one frame 212 accommodates at least one other frame 214, 216 by coupling of the coupling groove 212h and the insertion portion 214i, thereby reducing the module housing 210 according to the size of the cell assembly 100 applied.

Further, the battery module 200 of the present disclosure may be manufactured by minimizing the size of the module housing 210 to deliver in a compact size and making primary or secondary modification according to the size of the cell assembly 100 in the assembling process. Accordingly, it is possible to reduce the delivery or storage cost of the battery module 200.

Referring back to FIGS. 6 and 7, the cover plates 212a, 214a, 216a and the bottom plates 212b, 214b, 216b may be coupled to each other. The cover plates 212a, 214a, 216a may respectively include insertion grooves 212g, 214g, 216g at which the outer surface of the body runs inward. The bottom plates 212b, 214b, 216b may respectively include coupling protrusions 212p, 214p, 216p which are inserted into the insertion grooves 212g, 214g, 216g. The insertion grooves 212g, 214g, 216g and the coupling protrusions 212p, 214p, 216p may be respectively coupled to each other by male-female coupling. The insertion grooves 212g, 214g, 216g and the coupling protrusions 212p, 214p, 216p may be respectively disposed in contact with each other.

For example, as shown in FIGS. 6 and 7, the cover plates 212a, 214a, 216a of the first frame 212, the second frame 214 and the third frame 216 may include, on the bottom surface, the insertion grooves 212g, 214g, 216g, into which the coupling protrusions 212p, 214p, 216p of the bottom plates 212b, 214b, 216b of the first frame 212, the second frame 214, and the third frame 216 are inserted respectively.

Further, the at least two frames may be configured to move in one direction when the insertion grooves 212g, 214g, 216g and the coupling protrusions 212p, 214p, 216p are coupled to each other. For example, as shown in FIGS. 6 and 7, the insertion grooves 212g, 214g, 216g respectively provided in the cover plates 212a, 214a, 216a may extend in the front-rear direction. As shown in FIG. 7, the coupling protrusions 212p, 214p, 216p of the bottom plates 212b, 214b, 216b may extend in the front-rear direction.

According to this configuration of the present disclosure, the present disclosure includes the insertion grooves and the coupling protrusions, so it is possible to easily couple the cover plates of the first frame 212, the second frame 214 and the third frame 216 to the bottom plates 21b, and when each cover plate and each bottom plate coupled to each other move in the front-rear direction, the size of the module housing 210 may be changed.

Meanwhile, referring back to FIGS. 2 and 5, the battery module 200 of the present disclosure may further include a fixing member (not shown) configured to limit the length change of the module housing 210. For example, the fixing member may be an adhesive. The adhesive may be attached to an adhesive surface between the first frame 212, the second frame 214 and the third frame 216.

For example, as shown in FIG. 6, the adhesive may be attached between the inner surface of the coupling groove 212h of the first frame 212 and the outer surface of the insertion portion 214i of the second frame 214 to combine the first frame 212 and the second frame 214. The adhesive may be attached between the inner surface of the coupling groove 21h of the second frame 214 and the outer surface of the insertion portion 21i of the third frame 216 to combine the second frame 214 and the third frame 216.

According to this configuration of the present disclosure, the present disclosure further includes the fixing member configured to limit the length change of the module housing 210, thereby preventing the length of the module housing 210 from changing after the manufacturing of the battery module 200 is completed. Accordingly, it is possible to increase the manufacturing productivity of the battery module 200. It is possible to prevent faults such as the size change of the module housing 210 by external impacts after the products are manufactured.

Figure 8:
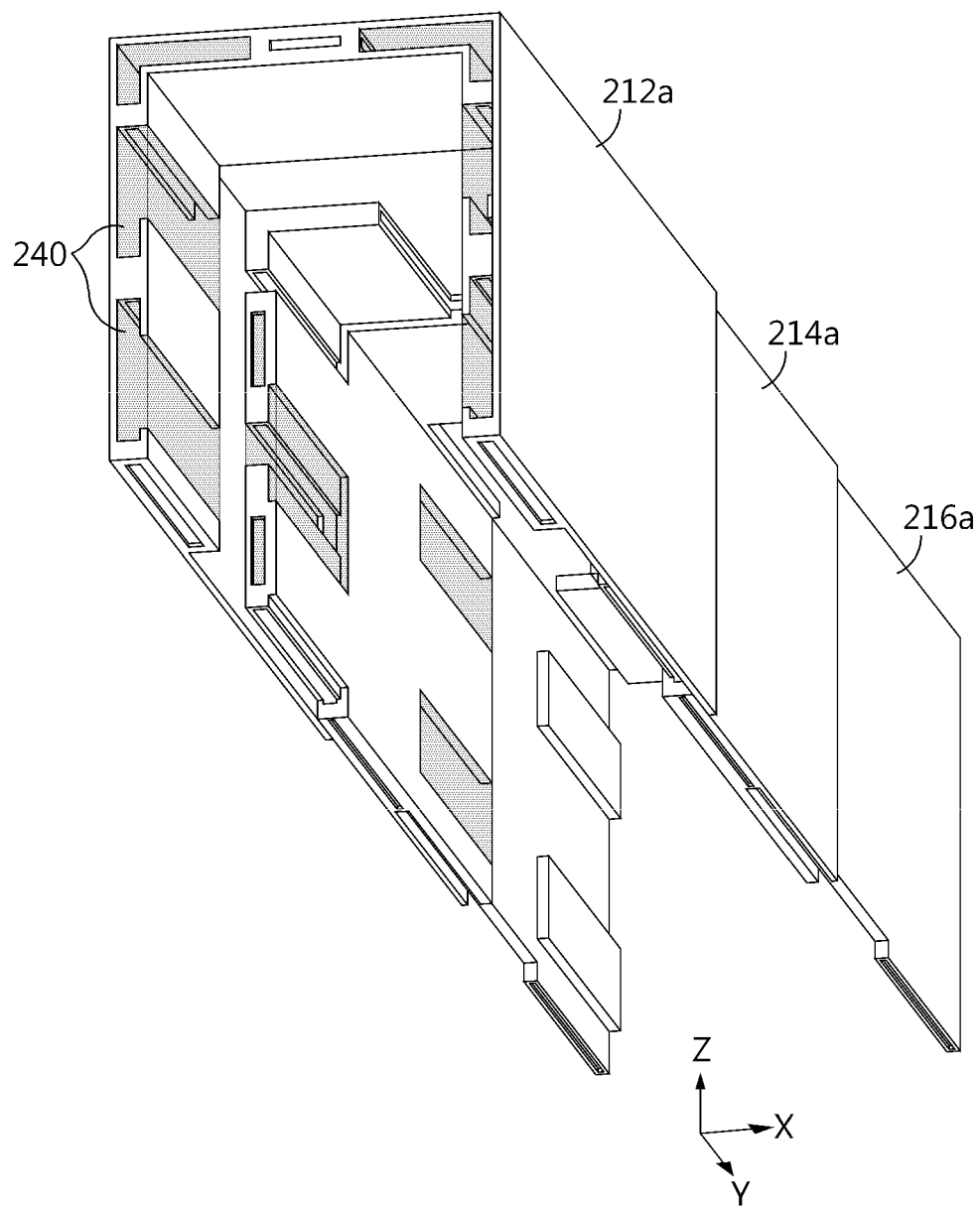
FIG. 8 is a bottom perspective view schematically showing cover plates of a battery module according to another embodiment of the present disclosure.

FIG. 8 is a bottom perspective view schematically showing cover plates of a battery module according to another embodiment of the present disclosure.

Referring to FIG. 8, the module housing 210 of the battery module 200 according to another embodiment of the present disclosure may further include a filler 240 in each of the coupling grooves 212h, 214h when compared with the module housing 210 of FIG. 6. For example, as shown in FIG. 8, the filler 240 may be configured to fill an empty space of the coupling grooves 212h, 214h into which the insertion portions 212i, 214i, 216i are not inserted. The filler 240 may be configured to be cured after it is filled in each of the coupling grooves 212h, 214h in a liquid state. For example, the filler 240 may be polymer resin. For example, the filler 240 may be epoxy resin.

Figure 9:
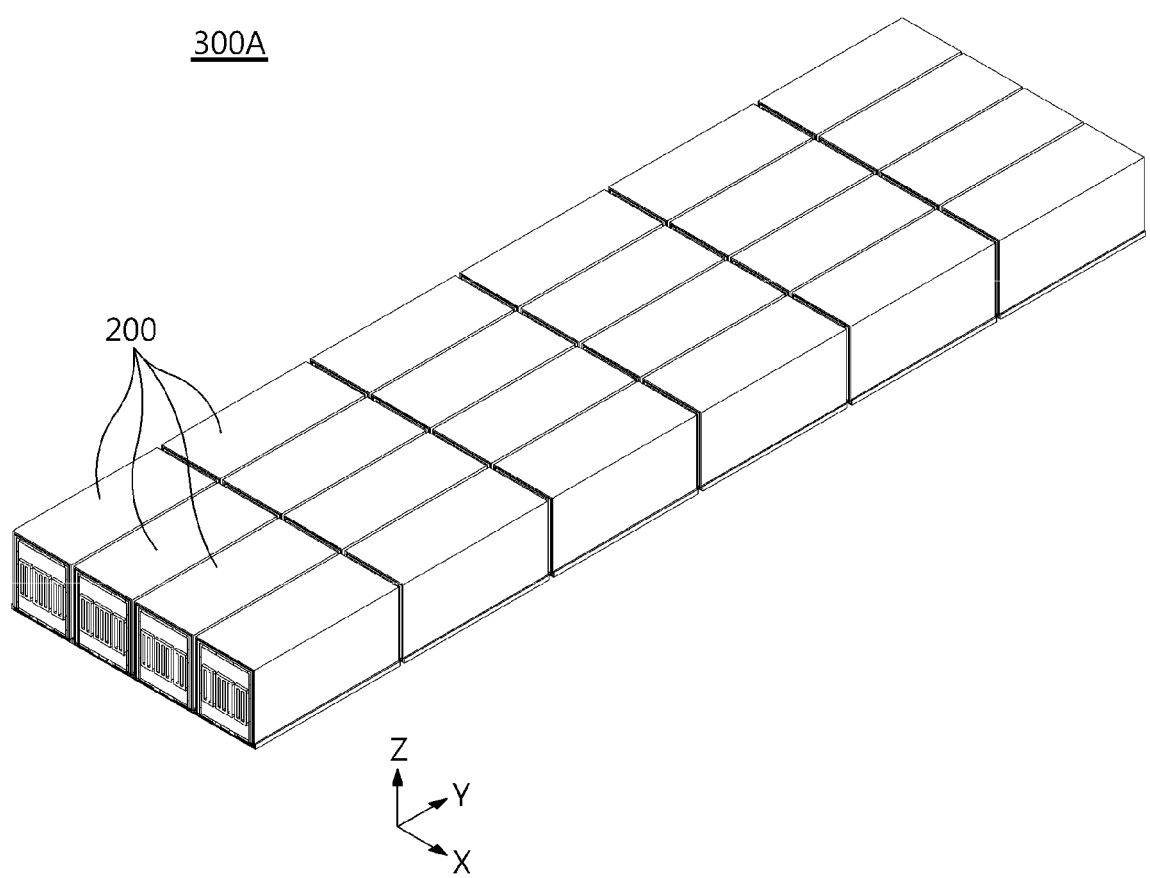
FIG. 9 is a perspective view schematically showing a battery pack including a plurality of battery modules according to another embodiment of the present disclosure.

FIG. 9 is a perspective view schematically showing a battery pack including a plurality of battery modules according to another embodiment of the present disclosure.

Referring to FIG. 9, the battery pack 300A according to an embodiment of the present disclosure includes at least two battery modules 200. The at least two battery modules 200 may be arranged such that the sides of the module housings 210 come into contact with each other. For example, as shown in FIG. 9, 24 battery modules 200 may be arranged in four rows and six columns. In this instance, four battery modules 200 arranged in each row may be arranged such that the sides of the module housings 210 come into contact with each other.

Figure 10:
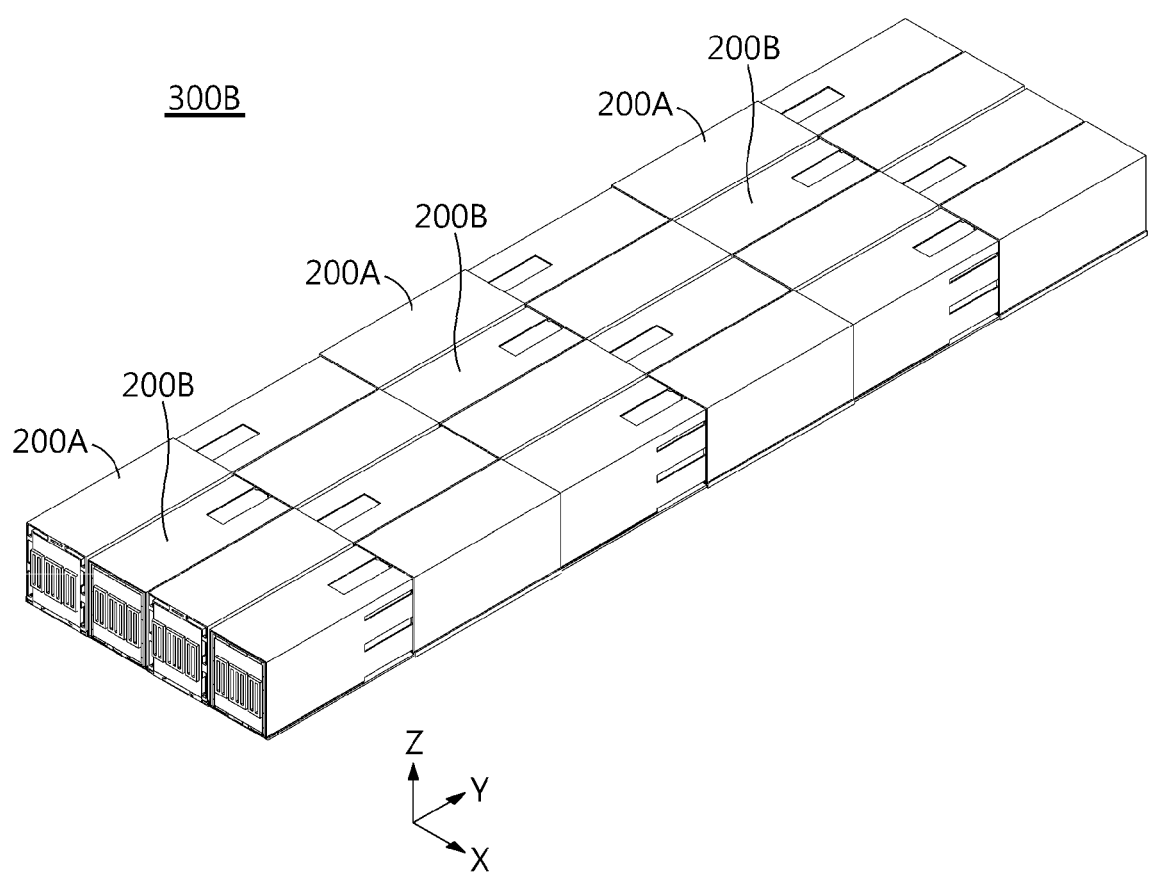
FIG. 10 is a perspective view schematically showing a battery pack including a plurality of battery modules according to still another embodiment of the present disclosure.

FIG. 10 is a perspective view schematically showing a battery pack including a plurality of battery modules according to still another embodiment of the present disclosure.

Referring to FIG. 10 together with FIG. 3, first, the battery pack 300B of FIG. 10 may be configured such that any one of at least two frames 212, 214, 216 provided in each of the battery modules 200A, 200B, 200C, 200D accommodates the other frame. For example, any one frame 212 may be larger than the other frame 214 or another frame 216.

By this structural feature, the battery pack 300B of the present disclosure may be configured such that the frame 212 having the larger size provided in one battery module 200A may come into contact with the frames 214, 216 having the smaller size in the other battery module 200B. When the plurality of battery modules is arranged as described above, it is possible to effectively reduce the size of the gap between the plurality of battery modules.

For example, referring to FIG. 10, the battery pack 300B according to another embodiment may include 12 battery modules 200A, 200B having secondary modification as shown in FIG. 3. The 12 battery modules 200A, 200B may be arranged in four rows and three columns. The first frame 212 of one battery module 200A may come into contact with the second frame 214 of the other battery module 200B. That is, one battery module 200A and the other battery module 200B may be symmetrically arranged in the front-rear direction. In other words, the front and rear sides of one battery module 200A and the other battery module 200B may be disposed in the opposite direction.

Figure 11:
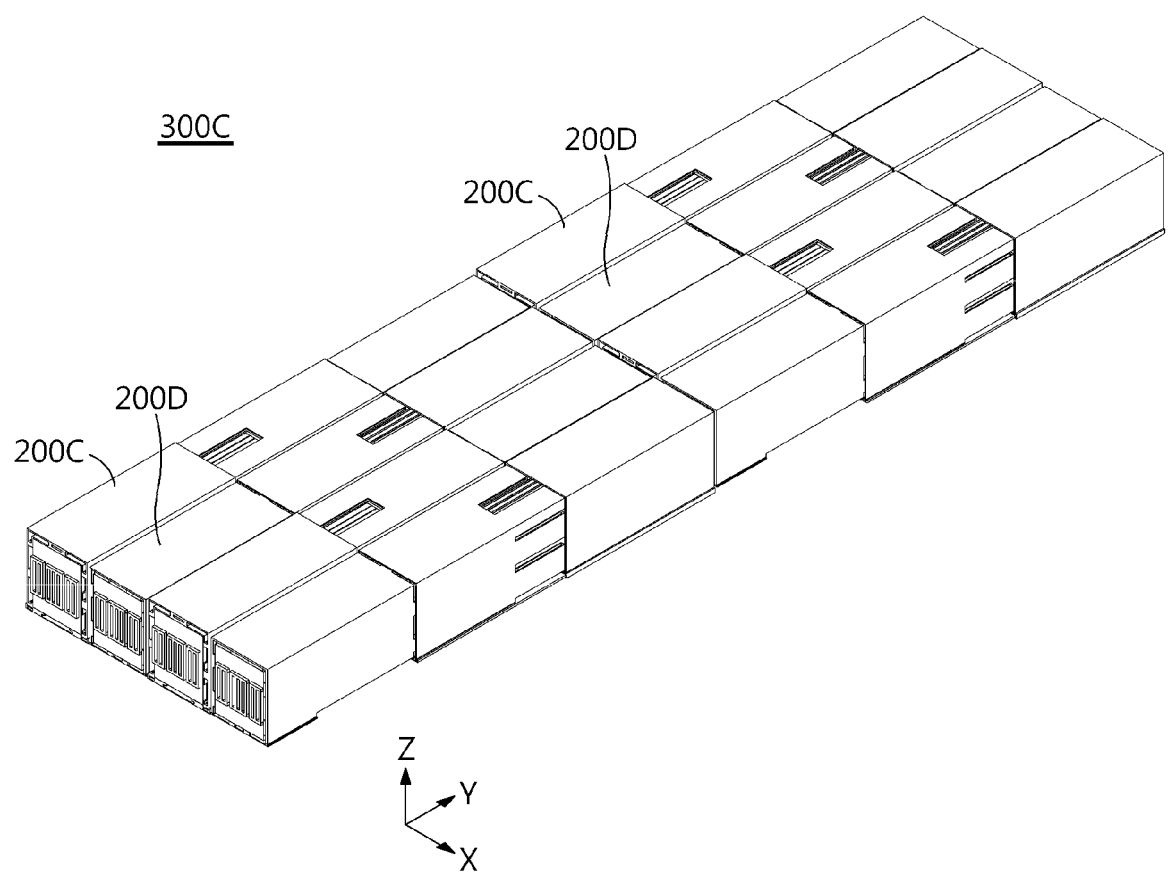
FIG. 11 is a perspective view schematically showing a battery pack including a plurality of battery modules according to yet another embodiment of the present disclosure.

FIG. 11 is a perspective view schematically showing a battery pack including a plurality of battery modules according to yet another embodiment of the present disclosure.

Additionally, referring to FIG. 11 together with FIG. 4, the battery pack 300C according to yet another embodiment of the present disclosure may include 8 battery modules 200C, 200D having secondary modification as shown in FIG. 4. The 8 battery modules 200C, 200D may be arranged in four rows and two columns. The first frame 212 of one battery module 200C may come into contact with the third frame 216 of the other battery module 200D. The second frame 214 of one battery module 200C may come into contact with the second frame 214 of the other battery module 200D. That is, one battery module 200C and the other battery module 200D may be symmetrically arranged in the front-rear direction.

According to this configuration of the present disclosure, the present disclosure is configured such that the frame having a larger size in one battery module 200 comes into contact with the frame having a smaller size in the other battery module 200, thereby minimizing the size of the gap between the plurality battery modules 200, and effectively increasing the energy density of the battery pack 300. Additionally, when the plurality of battery modules 200 is arranged in contact with each other, there is no empty space, so the battery modules 200 may not lose the arrangement from external impacts. Accordingly, it is possible to effectively increase the durability of the battery pack 300.

The battery pack 300 according to the present disclosure may include at least two battery modules 200 according to the present disclosure. Additionally, in addition to the battery module 200, the battery pack 300 may further include various types of devices for controlling the charge/discharge of the cell assembly 100, for example, a Battery Management System (BMS), a current sensor and a fuse.

Additionally, the battery module 200 according to the present disclosure may be applied to vehicles such as electric vehicles or hybrid electric vehicles. That is, the vehicle according to the present disclosure may include the battery module 200.

Meanwhile, the terms indicating directions as used herein such as upper, lower, left, exact, front and rear are used for convenience of description only, and it is obvious to those skilled in the art that the term may change depending on the position of the stated element or an observer.

While the present disclosure has been hereinabove described with regard to a limited number of embodiments and drawings, the present disclosure is not limited thereto and it is obvious to those skilled in the art that various modifications and changes may be made thereto within the technical aspects of the present disclosure and the equivalent scope of the appended claims.

DESCRIPTION OF REFERENCE NUMERALS

300: Battery pack
200: Battery module
110: Secondary battery 100: Cell assembly
210: Module housing 230: Busbar assembly
212, 214, 216: First frame, Second frame, Third frame
212a, 214a, 216a: Cover plate
212b, 214b, 216b: Bottom plate
212h, 214h: Coupling groove
212i, 214i, 216i: Insertion portion
212g, 214g, 216g: Insertion groove
212p, 214p, 216p: Coupling protrusion
240: Filler

What is claimed is:

1. A battery module comprising:
a cell assembly including a plurality of secondary batteries; and
a module housing in which the cell assembly is disposed, wherein the module housing includes at least two frames coupled to one another, the at least two frames being configured to change a length of the module housing according to a size of the cell assembly, and
wherein each of the at least two frames has a coupling groove into which a part of an adjacent one of the frames is inserted, and an insertion portion which is inserted into the coupling groove of the adjacent one of the frames.

2. The battery module according to claim 1, wherein the at least two frames are configured such that a first one of the frames is disposed in an internal space of or extends from the internal space of a second one of the frames.

3. The battery module according to claim 1, wherein each of the at least two frames includes:
a cover plate which covers a top of the cell assembly and sides of the cell assembly; and
a bottom plate coupled with a bottom of the cover plate, the cell assembly being mounted onto the bottom plate.

4. The battery module according to claim 1, wherein each of the coupling groove and the insertion portion of each of the at least two frames extends in a lengthwise direction in which the length of the module housing is configured to change, and the at least two frames are each configured to be movable in the lengthwise direction when the coupling groove and the insertion portion of each of the at least two frames are coupled to the corresponding insertion portion and coupling grove of the adjacent one of the frames.

5. The battery module according to claim 1, wherein one of the at least two frames is configured to receive at least one other frame of the at least two frames therein by coupling of the coupling grooves with corresponding ones of the insertion portions.

6. The battery module according to claim 3, wherein a first one of the cover plate and the bottom plate includes an insertion groove extending inward, and a second one of the cover plate and the bottom plate includes a coupling protrusion inserted into the insertion groove, thereby coupling together the cover plate and the bottom plate.

7. The battery module according to claim 1, further comprising a fixing member configured to limit the length of the module housing by limiting a freedom of motion of the at least two frames relative to one another.

8. The battery module according to claim 1, further comprising a filler disposed within a portion of each of the coupling grooves into which the corresponding insertion portion is not inserted.

9. A battery pack comprising at least two battery modules, each of the battery modules comprising:
   a cell assembly including a plurality of secondary batteries; and
   a module housing in which the cell assembly is disposed, wherein the module housing includes at least two frames coupled to one another, the at least two frames being configured to change a length of the module housing according to a size of the cell assembly,
   wherein the at least two battery modules are arranged such that sides of the module housings contact each other, and
   wherein a larger one of the at least two frames of a first one of the at least two battery modules contacts a smaller one of the at least two frames of a second one of the at least two battery modules.

10. A vehicle comprising at least one battery pack each according to claim 9.

11. A battery pack comprising at least two battery modules each according to claim 1, wherein the at least two battery modules are arranged such that sides of the module housings contact each other.

12. The battery pack according to claim 11, wherein a larger one of the at least two frames of a first one of the at least two battery modules contacts a smaller one of the at least two frames of a second one of the at least two battery modules.

13. A vehicle comprising at least one battery pack each according to claim 12.

* * * * *